US011784792B2

(12) United States Patent
Meier et al.

(10) Patent No.: US 11,784,792 B2
(45) Date of Patent: Oct. 10, 2023

(54) SECURE SOFTWARE INTERFACE

(71) Applicant: Infineon Technologies AG, Neubiberg (DE)

(72) Inventors: Manuela Meier, Munich (DE); Andreas Graefe, Munich (DE)

(73) Assignee: Infineon Technologies AG, Neubiberg (DE)

( * ) Notice: Subject to any disclaimer, the term of this patent is extended or adjusted under 35 U.S.C. 154(b) by 161 days.

(21) Appl. No.: 16/948,689

(22) Filed: Sep. 29, 2020

(65) Prior Publication Data

US 2022/0103342 A1    Mar. 31, 2022

(51) Int. Cl.
*H04L 9/06* (2006.01)
*H04L 9/08* (2006.01)
*G06F 21/72* (2013.01)

(52) U.S. Cl.
CPC ............ *H04L 9/0643* (2013.01); *G06F 21/72* (2013.01); *H04L 9/0894* (2013.01)

(58) Field of Classification Search
CPC ...... H04L 9/0643; H04L 9/0894; G06F 21/72

USPC .......................................................... 713/189
See application file for complete search history.

(56) References Cited

U.S. PATENT DOCUMENTS

| | | | |
|---|---|---|---|
| 2016/0125201 A1* | 5/2016 | Villatel | G06F 21/74 726/30 |
| 2016/0241523 A1* | 8/2016 | Ahn | H04L 63/0428 |
| 2018/0267726 A1* | 9/2018 | Sun | G06F 21/78 |

\* cited by examiner

*Primary Examiner* — Kambiz Zand
*Assistant Examiner* — Phuc Pham
(74) *Attorney, Agent, or Firm* — Harrity & Harrity, LLP

(57) ABSTRACT

A system may include a first processing component arranged in a secure domain of the system. The system may include a second processing component arranged outside of the secure domain of the system. The system may include one or more hardware accelerators to perform operations in association with providing communication security for the system. The one or more hardware accelerators may be accessible by the first processing component via a channel in the secure domain. The one or more hardware accelerators may be accessible by at least the second processing component via a channel outside of the secure domain.

25 Claims, 2 Drawing Sheets

SECURE SOFTWARE INTERFACE

BACKGROUND

A system may include one or more hardware accelerators capable of performing operations related to providing communication security for the system. Such hardware accelerators include, for example, a cryptographic accelerator capable of performing encryption and/or decryption for securing data, a hash accelerator for executing a hash function associated with verifying authenticity of the data, among other examples. In some cases, a hardware accelerator is a co-processor of the system, and is intended to improve performance of the system by providing dedicated hardware for performing operations related to providing communication security (rather than such operations being performed by software and/or by a general purpose central processing unit (CPU) of the system).

SUMMARY

In some implementations, a system includes a first processing component arranged in a secure domain of the system; a second processing component arranged outside of the secure domain of the system; and one or more hardware accelerators to perform operations in association with providing communication security for the system, wherein the one or more hardware accelerators are accessible by the first processing component via a channel in the secure domain, and wherein the one or more hardware accelerators are accessible by at least the second processing component via a channel outside of the secure domain.

In some implementations, a system includes one or more hardware accelerators to perform cryptographic or hash operations in association with providing communication security; a secure processing component in a secure domain; a set of non-secure processing components outside of the secure domain; a channel that provides the secure processing component with access to the one or more hardware accelerators; and one or more channels that provide the set of non-secure processing components with access to the one or more hardware accelerators, the one or more channels being outside of the secure domain.

In some implementations, a system includes a first processing component arranged in a secure domain of the system; a second processing component arranged outside of the secure domain of the system; a hardware accelerator to perform operations in association with providing communication security for the system, wherein the hardware accelerator is accessible by the first processing component via the secure domain, and wherein the hardware accelerator is accessible by the second processing component outside of the secure domain and without communicating with the first processing component; and a set of security components for enhancing security of the system.

DETAILED DESCRIPTION

Figure 1:
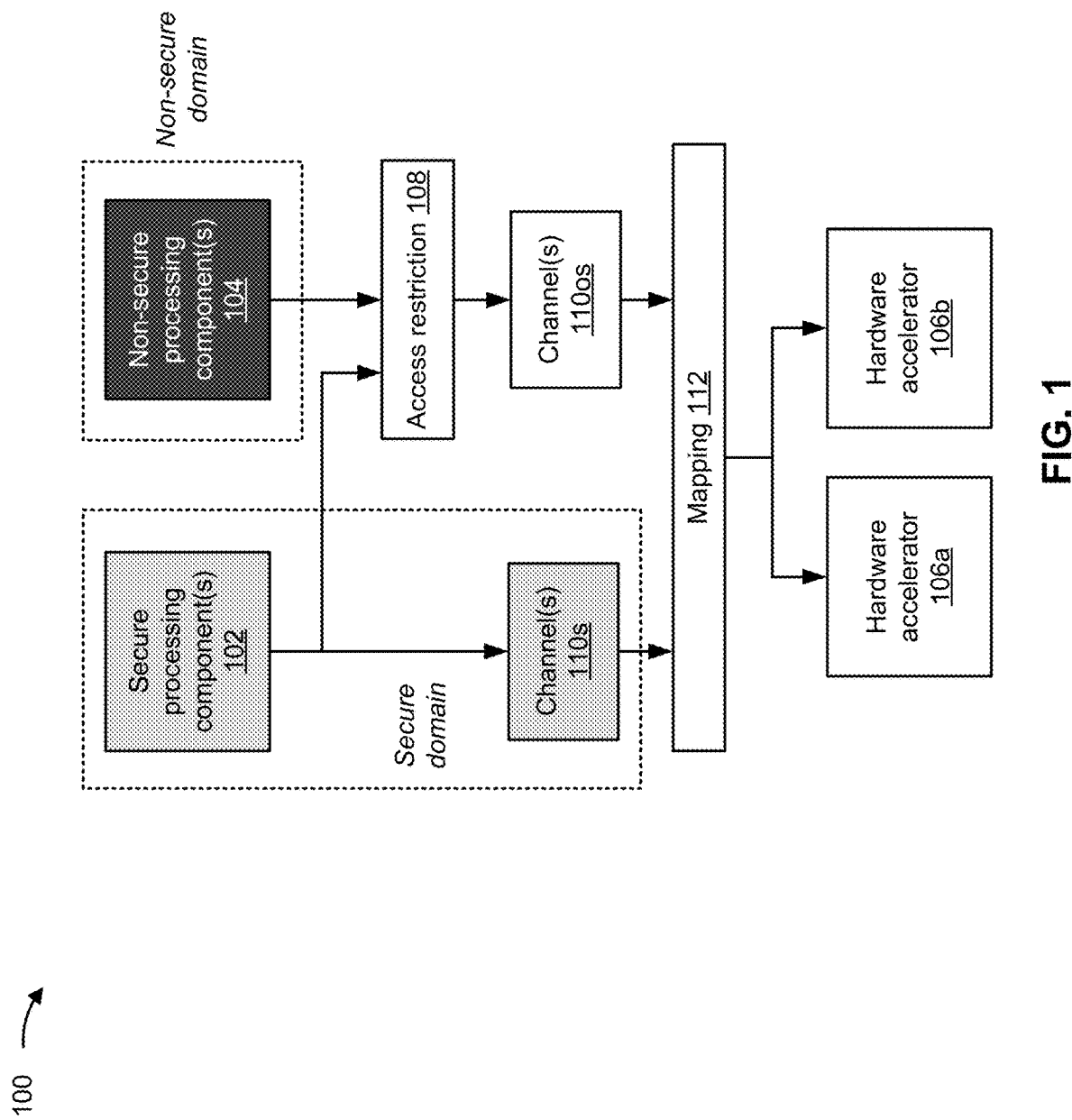
FIG. 1 is a diagram illustrating an example architecture for a portion of a system that includes a hardware accelerator accessible by a processing component in a secure domain and by a processing component outside of the secure domain, in accordance with various aspects of the present disclosure.

The following detailed description of example implementations refers to the accompanying drawings. The same reference numbers in different drawings may identify the same or similar elements.

A system may include a processing component, such as a CPU, arranged in a secure domain of the system. The secure domain of the system may be provided by, for example, a hardware security module (HSM) that includes components for managing cryptographic keys, performing encryption and decryption functions, performing authentication functions, or the like. The system may further include a processing component arranged outside of the secure domain (e.g., CPU that is not included in the HSM). Conventionally, hardware accelerators of the system (e.g., a cryptographic accelerator, a hash accelerator, or the like) are included in the secure domain. Therefore, if the processing component arranged outside of the secure domain (herein referred to as a non-secure processing component) needs to request an operation by a hardware accelerator, the non-secure processing component needs to communicate with the processing component arranged in the secure domain (herein referred to as a secure processing component) in order to request an action by the hardware accelerator. That is, the non-secure processing component cannot directly access the hardware accelerators and instead must access the hardware accelerators through the secure processing component.

Such a configuration increases a number of data transfers needed in association with performing cryptographic operations at the request of the non-secure processing component, and also wastes resources of the secure processing component due to the multi-processor interaction required by the involvement of the secure processing component in facilitating access to the hardware accelerators by the non-secure processing component. Further, complexity of the system is increased due to a need for a software split among the secure processing component and the non-secure processing component.

One technique for overcoming this issue is to include an additional set of hardware accelerators. Here, the additional set of hardware accelerators is directly accessible by the non-secure processing component and is not used by the secure processing component. However, such a technique increases cost and size of the system due to the need for additional hardware accelerators, and therefore is undesirable.

Some implementations described herein provide a system including a set of hardware accelerators that is accessible by both non-secure processing components and secure processing components of the system. That is, implementations described herein provide a system that enables hardware accelerators to be shared on different levels of security.

In some implementations, the system may include a secure processing component, a non-secure processing component, and one or more hardware accelerators to perform operations in association with providing communication security for the system. Here, the one or more hardware accelerators are accessible by the secure processing component via a channel in a secure domain, and the one or more hardware accelerators are accessible by the non-secure processing component via a channel outside of the secure domain. That is, the one or more hardware accelerators are accessible by the non-secure processing component without going through the secure processing component. In some implementations, the system may include one or more additional security components associated with maintaining security in the system, which may be needed since the one or more hardware accelerators are being shared between the secure domain and the non-secure domain. Additional details are provided below.

In some implementations, the system described herein eliminates multi-processor interactions for cryptographic operations needed by the non-secure processing component, meaning that a number of data transfers is reduced and wasted resources of the secure processing component are conserved. Further, complexity of the system is reduced since the need for a software split among the secure processing component and the non-secure processing component is eliminated.

FIG. 1 is a diagram illustrating an example architecture 100 for a portion of a system that includes a hardware accelerator accessible by a processing component in a secure domain and by a processing component outside of the secure domain, in accordance with various aspects of the present disclosure. As shown in FIG. 1, the architecture 100 includes a secure processing component 102, one or more non-secure processing components 104, one or more hardware accelerators 106, an access restriction component 108, a set of channels 110, and a mapping component 112.

Secure processing component 102 includes a processing component arranged in a secure domain of the system. For example, secure processing component 102 may be a CPU arranged in the secure domain, a direct memory access (DMA) component arranged in the secure domain, or another type of processing component arranged in the secure domain. In some implementations, the secure domain is an access restricted domain. For example, in some implementations, secure processing component 102 is a component of an HSM which is access restricted. In some implementations, as shown in FIG. 1, secure processing component 102 has access to the one or more hardware accelerators 106 of the system via one or more channels 110s (i.e., one or more channels 110 in the secure domain).

Non-secure processing component 104 includes a processing component arranged outside of the secure domain of the system. That is, non-secure processing component 104 includes a component that is arranged in a non-secure domain of the system (e.g., a processing component not included in the HSM). For example, non-secure processing component 104 may be a CPU arranged outside of the secure domain, a DMA component arranged outside of the secure domain, or another type of processing component arranged outside of the secure domain. In some implementations, as shown in FIG. 1, non-secure processing component 104 has access to the one or more hardware accelerators 106 of the system via one or more channels 110os (i.e., one or more channels 110 outside of the secure domain, shown as channel(s) 110os in FIG. 1). That is, in some implementations, non-secure processing component 104 has access to the one or more hardware accelerators 106 without a need to communicate with secure processing component 102. In some implementations, the system includes one or more non-secure processing components 104.

Hardware accelerator 106 is a component that performs operations for the system in association with providing communication security. For example, hardware accelerator 106 may include a cryptographic accelerator, a hash accelerator, or another type of hardware component for performing a cryptographic operation. In some implementations, hardware accelerator 106 may be a co-processor of the system. In some implementations, hardware accelerator 106 improves performance of the system by providing hardware for performance of cryptographic operations (rather than cryptographic operations being performed by software, by secure processing component 102, by non-secure processing component 104, or the like). In some implementations, the system includes one or more hardware accelerators 106 (e.g., hardware accelerators 106a and 106b are shown in FIG. 1).

Access restriction component 108 is a component to manage access to the one or more hardware accelerators 106 via the one or more channels 110os outside of the secure domain. For example, since secure processing component 102 and non-secure processing component 104 have access to any hardware accelerator 106 of the system, some security features may be need to implemented in order to maintain system security and ensure that data flow is handled appropriately. In some implementations, access restriction component 108 is configurable by secure processing component 102 to allow secure processing component 102 to configure such security features in the system (e.g., since non-secure processing component 104 may not be capable of configuring a secure system).

Mapping component 112 is a component to provide mapping of the one or more hardware accelerators 106 to the channels 110 of the system. That is, mapping component 112 includes a component to manage mapping of the one or more channel 110s and the one or more channels 110os to the hardware accelerators 106. For example, when hardware accelerator 106a is being used for an operation requested by secure processing component 102, mapping component 112 maps hardware accelerator 106a to a particular channel 110s such that secure processing component 102 and hardware accelerator 106 can exchange information via the particular channel 110s. As another example, when hardware accelerator 106a is being used for an operation requested by non-secure processing component 104, mapping component 112 maps hardware accelerator 106a to a particular channel 110os such that non-secure processing component 104 and hardware accelerator 106 can exchange information via the particular channel 110os.

In some implementations, the system may further include a set of security components for enhancing security of the system, which may be needed since the one or more hardware accelerators 106 are being shared between secure processing component 102 and non-secure processing component 104.

In some implementations, the set of security components may include a masking component. In some implementations, the masking component is a component that provides key masking for keys associated with secure processing component 102 during use of the keys by the one or more hardware accelerators 106. That is, the masking component may provide key masking to enhance protection of keys used by secure processing component 102. In some implementations, the masking component may be implemented as a component in the secure domain of the system. In some implementations, the masking component may be implemented as a sub-component of mapping component 112.

In some implementations, the set of security components may include separate memory components for storing keys. For example, the set of security components may include a first memory used for storing keys associated with secure processing component 102 and a second memory used for storing keys associated with non-secure processing component 104, where the second memory is separate from the first memory. In this way, keys used by secure processing component 102 and keys used by non-secure processing component 104 may be stored in separate locations, thereby enhancing security of the system.

In some implementations, the set of security components may include a data clearing component. In some implementations, the data clearing component is a component to clear data from the one or more hardware accelerators 106 after an operation requested by secure processing component 102 is completed. That is, the data clearing component may ensure that data associated with an operation requested by secure processing component 102 is deleted from hardware accelerator 106 after the operation is completed (e.g., to prevent the data from leaking to the non-secure domain). In some implementations, the data clearing component may be implemented as a component in the secure domain of the system. In some implementations, the data clearing component may be implemented as a sub-component of mapping component 112.

In this way, a system may be configured such that the set of hardware accelerators 106 is accessible by both non-secure processing component 104 and secure processing component 102 of the system such that the set of hardware accelerators 106 can be shared on different levels of security. As a result, multi-processor interactions for cryptographic operations needed by non-secure processing component 104 may be eliminated, meaning that a number of data transfers is reduced and resources of secure processing component 102 are conserved. Further, complexity of the system is reduced since the need for a software split among secure processing component 102 and non-secure processing component 104 is eliminated.

As indicated above, FIG. 1 is provided as an example. Other examples may differ from what is described with regard to FIG. 1. The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more functions described as being performed by another set of components shown in FIG. 1.

Figure 2:
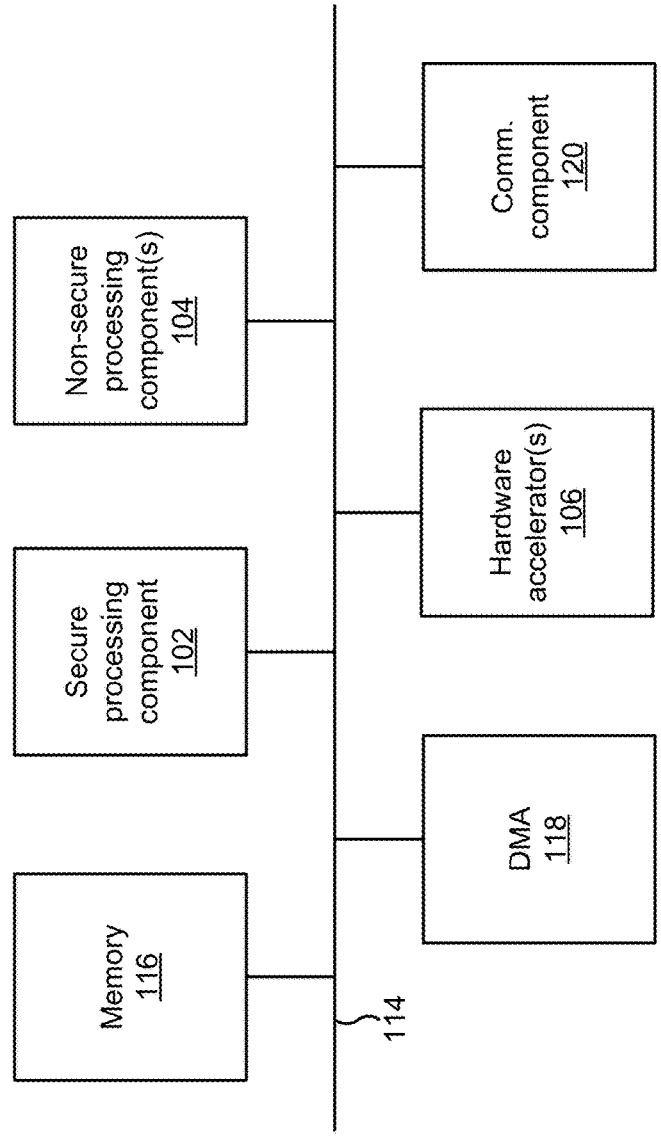
FIG. 2 is a diagram illustrating an example of the system that includes the hardware accelerator that is accessible by the processing component in the secure domain and the processing component outside of the secure domain described in association with FIG. 1.

FIG. 2 is a diagram illustrating an example of a system 200 that utilizes the architecture 100 including hardware accelerators 106 that are accessible by secure processing component 102 and non-secure processing component 104, as described in association with FIG. 1

As shown in FIG. 2, system 200 may include secure processing component 102, one or more non-secure processing components 104, one or more hardware accelerators 106, as well as a bus 114, a memory 116, a DMA 118, and a communication component 120.

Secure processing component 102 includes a processing component arranged in a secure domain of system 200, as described above with respect to FIG. 1. For example, in some implementations, secure processing component 102 may be a CPU arranged in the secure domain (e.g., a central processing unit, a graphics processing unit, a microprocessor, a controller, a microcontroller, a digital signal processor, a field-programmable gate array, an application-specific integrated circuit, or the like). Alternatively, in some implementations, secure processing component 102 may be a DMA component arranged in the secure domain, or another type of processing component arranged in the secure domain. In some implementations, secure processing component 102 is a component of an HSM which is access restricted.

Non-secure processing component 104 includes a processing component arranged outside of the secure domain of system 200, as described above with respect to FIG. 1. For example, in some implementations, non-secure processing component 104 may be a CPU arranged outside of the secure domain, a DMA component arranged outside of the secure domain, or another type of processing component arranged outside of the secure domain. In some implementations, system 200 includes one or more non-secure processing components 104.

Hardware accelerator 106 is a component that performs operations for the system in association with providing communication security, as described in association with FIG. 1. For example, hardware accelerator 106 may include a cryptographic accelerator, a hash accelerator, or another type of hardware component for performing a cryptographic operation. In some implementations, the system includes one or more hardware accelerators 106.

Bus 114 is a component that enables communication among the components of system 200. For example, bus 114 may enable communication between secure processing component 102 and hardware accelerator 106 and may enable communication between non-secure processing component 104 and hardware accelerator 106.

Memory 116 is a component to store and provide data to be processed by a component of system 200, such as secure processing component 102, non-secure processing component 104, hardware accelerator 106, or the like. In some implementations, memory 116 may include a RAM, a read only memory (ROM), and/or another type of memory (e.g., a flash memory, a magnetic memory, and/or an optical memory).

DMA 118 is a component to provide data stored by memory 116 to another component of system 200, such as hardware accelerator 106. In some implementations, DMA 118 provides data stored by memory 116 independent of a CPU of system 200 (i.e., DMA 118 provides direct memory access).

Communication component 120 includes a component that enables system 200 to communicate with other devices or systems. For example, communication component 120 may include a receiver, a transmitter, a transceiver, a modem, or another type of component that enables system 200 to communicate with other devices or systems.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) of system 200 may perform one or more functions described as being performed by another set of components of system 200.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
    a first processing component arranged in a secure domain of the system;
    a second processing component arranged in a non-secure domain located outside of the secure domain of the system;
    one or more hardware accelerators to perform operations in association with providing communication security for the system, wherein the first processing component and the second processing component are configured to share the one or more hardware accelerators,
        wherein the first processing component is configured to access the one or more hardware accelerators via a first channel configured in the secure domain for transmitting first information to the one or more hardware accelerators, and
        wherein the second processing component is configured to access the one or more hardware accelerators via a second channel configured in the non-secure domain for transmitting second information to the one or more hardware accelerators;
    an access restriction component arranged in the non-secure domain and coupled to the second channel between the second processing component and the one or more hardware accelerators, wherein the access restriction component is configured to manage access of the second processing component to the one or more hardware accelerators by managing the access of the second processing component to the second channel,
        wherein the second processing component is configured to access the one or more hardware accelerators via the access restriction component and via the second channel; and
    a mapping component arranged in the non-secure domain and configured to dynamically map the first channel and the second channel to the one or more hardware accelerators.

2. The system of claim 1, further comprising a masking component to provide key masking for a key associated with the first processing component during use of the key by any of the one or more hardware accelerators.

3. The system of claim 1, further comprising:
    a first memory for storing keys associated with the first processing component, and
    a second memory for storing keys associated with the second processing component, the second memory being separate from the first memory.

4. The system of claim 1, further comprising a data clearing component to clear data from the one or more hardware accelerators after an operation requested by the first processing component is completed.

5. The system of claim 1, wherein the first processing component is a component of a hardware security module (HSM), the HSM being access restricted.

6. The system of claim 1, wherein the one or more hardware accelerators include at least one of a cryptographic accelerator or a hash accelerator.

7. The system of claim 1, wherein first data is communicated from the first processing component to the first channel, from the first channel to the mapping component, and from the mapping component to a first particular hardware accelerator of the one or more hardware accelerators, and
    wherein second data is communicated from the second processing component to the access restriction component, from the access restriction component to the second channel, from the second channel to the mapping component, and from the mapping component to a second particular hardware accelerator of the one or more hardware accelerators.

8. The system of claim 1, wherein the mapping component is coupled to and between the first channel and the one or more hardware accelerators, and
    wherein the mapping component is coupled to and between the second channel and the one or more hardware accelerators.

9. The system of claim 8, wherein the mapping component is configured to receive a first request from the first processing component to use the one or more hardware accelerators and dynamically map the first channel to the one or more hardware accelerators based on the first request, and
    wherein the mapping component is configured to receive a second request from the second processing component to use the one or more hardware accelerators and dynamically map the second channel to the one or more hardware accelerators based on the second request.

10. The system of claim 9, wherein the mapping component is configured to dynamically map the second channel to the one or more hardware accelerators based on access of the second processing component to the second channel.

11. The system of claim 8, wherein the mapping component is configured to receive a first request from the first processing component to use the one or more hardware accelerators and dynamically maps the first channel to a first hardware accelerator or a second hardware accelerator of the one or more hardware accelerators based on the first request, and
wherein the mapping component is configured to receive a second request from the second processing component to use the one or more hardware accelerators and dynamically maps the second channel to the first hardware accelerator or the second hardware accelerator of the one or more hardware accelerators based on the second request.

12. The system of claim 1, wherein the one or more hardware accelerators are arranged entirely within the non-secure domain.

13. The system of claim 1, wherein the first processing component is configured to configure the access restriction component to manage the access of the second processing component to the second channel according to at least one security feature and thereby manage the access of the second processing component to the one or more hardware accelerators.

14. A system, comprising:
one or more hardware accelerators to perform cryptographic or hash operations in association with providing communication security;
a secure processing component arranged in a secure domain;
a set of non-secure processing components arranged in a non-secure domain located outside of the secure domain;
a first channel that provides the secure processing component with access to the one or more hardware accelerators;
one or more second channels that provide the set of non-secure processing components with access to the one or more hardware accelerators, the one or more second channels being arranged in the non-secure domain;
an access restriction component arranged in the non-secure domain and coupled to the one or more second channels between the set of non-secure processing components and the one or more hardware accelerators, wherein the access restriction component is configured to manage access of the set of non-secure processing components to the one or more hardware accelerators by managing the access of the set of non-secure processing components to the one or more second channels,
wherein a non-secure processing component of the set of non-secure processing components is configured to access the one or more hardware accelerators via the one or more second channels and via the access restriction component; and
a mapping component arranged in the non-secure domain and configured to dynamically map the first channel and the one or more second channels to the one or more hardware accelerators.

15. The system of claim 14, further comprising a masking component to provide key masking for a key associated with the secure processing component during use of the key by any of the one or more hardware accelerators.

16. The system of claim 14, further comprising:
a first memory for storing keys associated with the secure processing component, and
a second memory for storing keys associated with the set of non-secure processing components, the second memory being separate from the first memory.

17. The system of claim 14, further comprising a data clearing component to clear data from the one or more hardware accelerators after an operation requested by the secure processing component is performed.

18. The system of claim 14, wherein the one or more hardware accelerators include at least one of a cryptographic accelerator or a hash accelerator.

19. The system of claim 14, wherein the secure processing component is configured to configure the access restriction component with one or more security features used for managing the access of the set of non-secure processing components to the one or more hardware accelerators.

20. A system, comprising:
a first processing component arranged in a secure domain of the system;
a second processing component arranged in a non-secure domain located outside of the secure domain of the system;
one or more hardware accelerators to perform operations in association with providing communication security for the system, wherein the first processing component and the second processing component are configured to share the one or more hardware accelerators,
wherein the first processing component is configured to access the one or more hardware accelerators via a first channel arranged in the secure domain for transmitting first information to the one or more hardware accelerators,
wherein the second processing component is configured to access the one or more hardware accelerators via a second channel arranged in the non-secure domain for transmitting second information to the one or more hardware accelerators,
wherein the second processing component is configured to access the one or more hardware accelerators without communicating with the first processing component;
a set of security components for enhancing security of the system,
wherein the set of security components comprises an access restriction component arranged in the non-secure domain and coupled to the second channel between the second processing component and the one or more hardware accelerators, wherein the access restriction component is configured to manage access of the second processing component to the one or more hardware accelerators by managing the access of the second processing component to the second channel, and
wherein the second processing component is configured to access the one or more hardware accelerators via the access restriction component; and
a mapping component arranged in the non-secure domain and configured to dynamically map the first channel and the second channel to the one or more hardware accelerators.

21. The system of claim 20, wherein the set of security components includes a masking component to provide key masking for a key associated with the first processing component during use of the key by the one or more hardware accelerators.

22. The system of claim 20, wherein the set of security components includes separate memory locations for storing keys associated with the first processing component and keys associated with the second processing component.

23. The system of claim 20, wherein the set of security components includes a data clearing component to clear data from the one or more hardware accelerator after an operation is performed by the hardware accelerator.

24. The system of claim 1, wherein the first processing component is configured to configure the access restriction component with one or more security features used for managing the access of the second processing component to the one or more hardware accelerators.

25. The system of claim 20, wherein first data is communicated from the first processing component to the first channel, from the first channel to the mapping component, and from the mapping component to a first particular hardware accelerator of the one or more hardware accelerators, and wherein second data is communicated from the second processing component to the access restriction component, from the access restriction component to the second channel, from the second channel to the mapping component, and from the mapping component to a second particular hardware accelerator of the one or more hardware accelerators.

* * * * *